United States Patent [19]

Eaton, Jr.

[11] 4,149,232
[45] Apr. 10, 1979

[54] VOLTAGE BOOSTING CIRCUITS

[75] Inventor: Sargent S. Eaton, Jr., Lewisville, Tex.

[73] Assignee: RCA Corporation, New York, N.Y.

[21] Appl. No.: 861,452

[22] Filed: Dec. 16, 1977

[51] Int. Cl.² ............................................. H02M 7/44
[52] U.S. Cl. ...................................... 363/60; 307/110
[58] Field of Search ........................... 363/59, 60, 101; 307/110; 320/1

[56] References Cited

U.S. PATENT DOCUMENTS

| 3,824,447 | 7/1974 | Kuwabara | 363/60 |
| 4,000,412 | 12/1976 | Rosenthal et al. | 363/60 X |
| 4,016,476 | 4/1977 | Morokawa et al. | 363/59 |
| 4,068,295 | 1/1978 | Portmann | 363/60 |

OTHER PUBLICATIONS

"On-Chip High-Voltage Generation in MNOS Integrated Circuits Using an Improved Voltage Multiplier Technique", by J. F. Dickson, IEEE Journal Solid State Cir., vol. SC-11, No. 3, Jun., 1976, pp. 374 to 378.

Primary Examiner—J D Miller
Assistant Examiner—Peter S. Wong
Attorney, Agent, or Firm—H. Christoffersen; A. L. Limberg

[57] ABSTRACT

Voltage boosting circuits of a type using a plurality of inverters with parallelled inputs, each inverter arranged to pump charge into a respective pair of booster capacitors—rather than one respective booster capacitor—to develop an output voltage in each stage which is doubled in amplitude over the voltage used to power the inverter in that stage. To this end, the inverter in each successive stage of the voltage boosting circuit is powered by the output voltage of the preceding stage.

12 Claims, 9 Drawing Figures

4,149,232

VOLTAGE BOOSTING CIRCUITS

The present invention relates to voltage boosting circuits of a type using a plurality of inverters with parallelled inputs, each inverter arranged to pump charge into at least one respective booster capacitor to develop an output voltage in each voltage boosting stage which is increased in amplitude over the voltage used to power the inverter in that stage, the inverter in each successive stage being powered by the output voltage of the preceding stage.

Voltage boosting circuits of this type are known generally from U.S. Pat. No. 3,824,447 issued July 16, 1974 to T. Kuwabara and entitled "Booster Circuit." Voltage boosting stages which may be operated as described in the previous paragraph are known also from U.S. Pat. No. 4,000,412 issued Dec. 28, 1976 to B. D. Rosenthal and A. G. F. Dingwall entitled "Voltage Amplitude Multiplying Circuits," and assigned to RCA Corporation. The voltage boosting circuits of the prior art rely on the principle of charging their booster capacitors in parallel from a primary voltage supply to the voltage of that supply during one portion of a clock cycle and then discharging them in series during another portion of a clock cycle to replenish the charge depleted from a storage capacitor. These prior art voltage boosting stages each use one bootstrap capacitor per stage, and the voltage boosting circuit provides an output voltage larger than the voltage available from their primary supply by a factor that in the limit approaches the number of booster stages.

The voltage boosting circuit of the present invention relies on charging different ones of a respective pair of serially connected booster capacitors in each stage on alternating portions of a clock cycle, charging from a primary supply only in the first voltage boosting stage, and in each successive voltage boosting stage charging from the output voltage of the preceeding voltage boosting stage. The voltage boosting circuit of the present invention provides an output voltage larger than the voltage available from the primary supply by a factor of two raised to a power equal to the number of voltage boosting stages.

Figure 1:
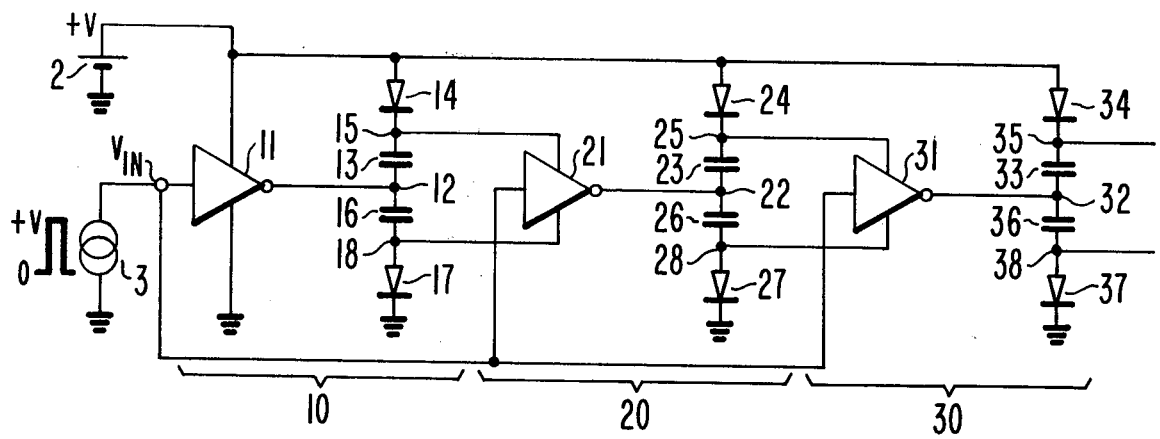
FIG. 1 is a schematic diagram partially in block form of a voltage boosting circuit embodying the present invention.

The FIG. 1 voltage boosting circuit has three stages 10, 20, 30 in cascade connection. A primary supply 2 of fixed potential $+V$ and a source 3 of switching voltage $V_{IN}$ swinging around $+V/2$ are shown at the left of the figure. Source 3 may, as shown, provide voltage pulses swinging between ground potential and $+V$ as shown in the FIG. 3 timing diagram.

Figure 2:
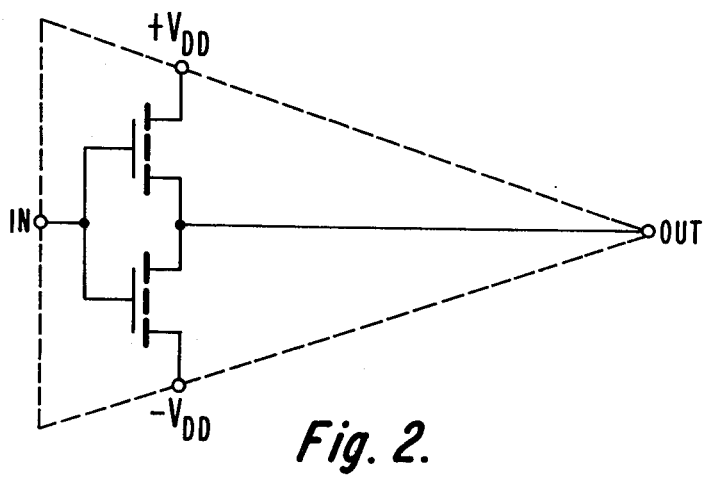
FIG. 2 is a schematic diagram of a typical inverter stage as known in the prior art as may be used in the voltage boosting circuit of FIG. 1.

Each of the voltage boosting stages 10, 20, 30 of FIG. 1 includes a respective inverter 11, 21, 31 which may be constructed, as shown in FIG. 2, of two complementary conductivity enhancement-mode field effect transistors (FET's) connected gate-to-gate at an input terminal IN, connected drain-to-drain at an output terminal OUT and connected at their source electrodes to respective ones of positive and negative operating supply terminals $+V_{DD}$ and $-V_{DD}$, respectively. Each of these inverters 11, 21, 31 has its input connected to receive $V_{IN}$ from source 3. The output voltage of each of these inverters will be at its positive operating supply potential during the time when $V_{IN}$ is less than $+V/2$ — i.e., ground — and will be at its negative operating supply potential during the time when $V_{IN}$ is greater than $+V/2$ — i.e., $+V$.

Figure 3:
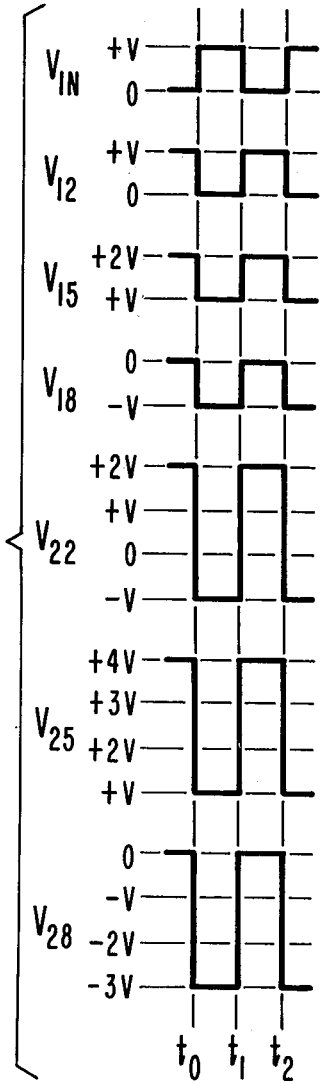
FIG. 3 is a timing diagram illustrative of the operation of the FIG. 1 voltage boosting circuit.

In FIG. 1, the positive and negative operating supply potentials for inverter 11 are at all times $+V$ and ground, respectively, so the output voltage of inverter 11 applied as $V_{12}$ to node 12 is the complement of $V_{IN}$, as shown in the FIG. 3 timing diagram. Each of the dioes 14, 17, 24, 27, 34 and 37 is used as an analog switch, providing connections between its anode and cathode only when forward-biased, as will be more particularly described.

At a time between $t_0$ and $t_1$ when $V_{IN}$ equals $+V$ the downward swing of $V_{12} = \overline{V_{IN}}$ as coupled via booster capacitor 13 to the cathode of diode 14 forward-biases diode 14. This clamps node 15, where capacitor 13 connects to the cathode of diode 14, to a potential less than $+V$ by the offset potential across forward-biased diode 14. For the purposes of present discussion, the magnitude of the offset potential across a forward-biased diode will be considered negligible compared to $+V$, so the voltage $V_{15}$ at node 15 is assumed to be substantially equal to $+V$, as diagrammed in FIG. 3. With node 15 clamped close to $+V$ and node 12 being drawn to ground, the charge on capacitor 13 is replenished to provide a voltage of an amplitude substantially equal to $+V$ between its plates connected to nodes 12 and 5, respectively.

At the time just before $t_0$, when $V_{IN}$ was at ground potential and $V_{12}$ essentially equalled $+V$, the upward swing of $V_{12}$ as coupled via booster capacitor 16 to the anode of diode 17 had forward-biased diode 17, clamping node 18 to a potential removed from ground by the offset potential across forward-biased diode 17. Capacitor 16 charged to have a potential substantially equal to $+V$ between its plates. Now at the time between $t_0$ and $t_1$ when $V_{IN}$ equals $+V$ and $V_{12}$ has swung to ground, node 18 is depressed below ground by an amount substantially equal to V. The difference between the voltages $V_{18}$ and $V_{15}$ at nodes 18 and 15, respectively, has an amplitude $+2V$ between times $t_0$ and $t_1$.

In the succeeding alternate half cycle between $t_1$ and $t_2$, when $V_{IN}$ has ground value and $V_{12}$ is at $+V$, the upward swing of $V_{12}$ as coupled via capacitor 13 to the cathode of diode 14 reverse-biases diode 14 and renders it non-conductive, while boosting the potential $V_{15}$ at node 15 substantially to $+2V$. The upward swing of $V_{12}$ as coupled via capacitor 16 to the anode of diode 17 forward-biases diode 17, clamping node 18 close to ground as in the time just before $t_0$, charging capacitor 16 to replenish its losses in the time between $t_0$ and $t_1$. The difference between the voltages $V_{18}$ and $V_{15}$ still has an amplitude $+2V$.

The potential between nodes 18 and 15 continuously has a value substantially equal to $+2V$, twice the amplitude of the $+V$ voltage afforded by the primary supply 2, not only over the cycle between $t_0$ and $t_2$, but for succeeding cycles. This doubled voltage might be used directly, but the form in which this doubled voltage is provided is particularly advantageous when used as the operating supply for a further inverter 21 having $V_{IN}$ applied to its input connection and responding to supply an output voltage $V_{22}$ via its output connection to a node 22. Between times $t_0$ and $t_1$ inverter 21 responds to $V_{IN}$ having a value of $+V$ to clamp its output voltage $V_{22}$ to its negative operating supply voltage, which being $V_{18}$ has a value substantially equal to $-V$ during this period. Between times $t_1$ and $t_2$ inverter 21 responds to $V_{IN}$ being ground value to clamp its output voltage $V_{22}$ to its positive operating supply voltage, which being $V_{15}$ has a value substantially equal to $+2V$ during this period. So $V_{22}$ alternates between $-V$ and $+2V$ levels to provide an alternating signal of amplitude three times that of $V_{IN}$ and of the $+V$ voltage afforded by the primary supply 2. This tripled voltage can be peak detected using rectifier and storage capacitor to provide a direct voltage substantially thrice that provided by the primary supply.

In FIG. 1, however, inverter 21 is used as part of a further voltage doubling stage 20. At the time between $t_0$ and $t_1$, the downward swing of $V_{22}$ as coupled via booster capacitor 23 to the cathode of diode 24 forward-biases diode 24. This clamps node 25, where capacitor 23 connects to the cathode of diode 24, to a potential substantially equal to $+V$ to replenish charge on capacitor 23 to provide a voltage substantially equal to $+3V$ between its plates connected to nodes 22 and 25, respectively. At the time just before $t_0$, when $V_{IN}$ was at ground potential and $V_{22}$ essentially equalled $+2V$, the upward swing of $V_{22}$ as coupled via booster capacitor 26 to the anode of diode 27 had forward-biased diode 27, clamping node 28 close to ground and causing the charging of capacitor 26 to have a potential substantially equal to $+2V$ between its plates. Now, at the time between $t_0$ and $t_1$, when $V_{IN}$ equals $+V$ and $V_{22}$ has swung to $-V$., node 28 is depressed below ground by an amount substantially equal to 3 V. The difference between the voltages $V_{28}$ and $V_{25}$ at nodes 28 and 25, respectively, has an amplitude of $+4V$ between times $t_0$ and $t_1$.

In the succeeding half cycle between $t_1$ and $t_2$, the upward swing of $V_{22}$ as coupled via capcitor 23 to the cathode of diode 24 reverse-biases that diode, rendering it non-conductive, and boosts the potential $V_{25}$ on node 25 substantially to $+4V$. The upward swing of $V_{15}$ as coupled via capacitor 26 to the anode of diode 27 forward-biases that diode, clamping node 28 close to ground as in the time just before $t_0$, charging capacitor 26 to replenish its losses in the time between $t_0$ and $t_1$. The difference between the voltages $V_{28}$ and $V_{25}$ continues to have an amplitude $+4V$.

The potential between nodes 28 and 25 continuously has a value substantially equal to $+4V$, four times the amplitude afforded by the primary supply 2, not only over the cycle between $t_0$ and $t_2$ but for succeeding cycles. Applied as operating voltage for inverter 31, this quadrupled voltage enables inverter 31 to provide an output voltage $V_{32}$ to node 32 that swings between $-3V$ and $+4V$. Diodes 34 and 37 and booster capacitors 33 and 36 when connected as shown provide for a voltage $V_{35}$ at node 35 that swings $+V$ and $+8V$ and for a voltage $V_{38}$ at node 38 that swings between $-7V$ and 0. The difference between $V_{38}$ and $V_{35}$ continuously has a value $+8V$. Still further voltage boosting stages may be added to the cascade connection of stages 10, 20, 30 to develop voltages approaching $2^nV$ where n is the number of stages in the cascade connection.

Figure 4:
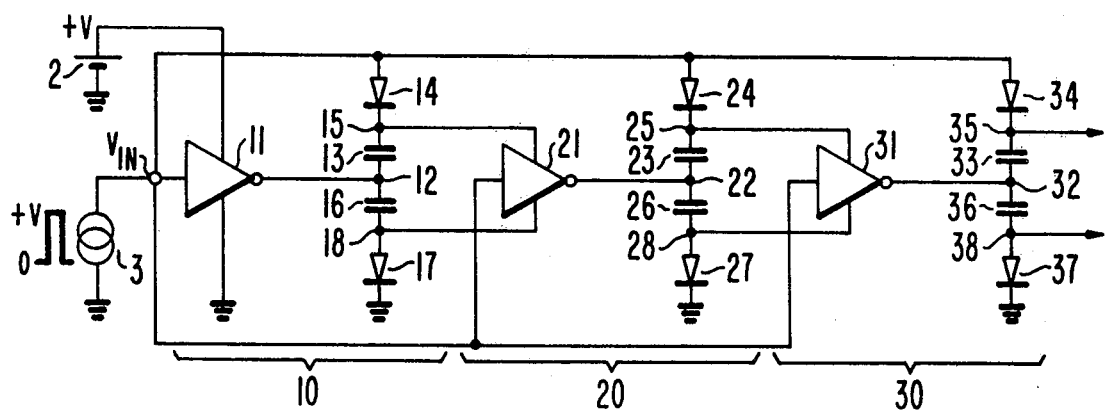
FIGS. 4–9 are schematic diagrams partially in block form of voltage boosting circuits that are alternative embodiments of the present invention.

FIG. 4 shows a modification of the FIG. 1 voltage biasing circuit in which the anodes of diodes 14, 24, 34 are connected to receive $V_{IN}$ from source 3 rather than $+V$ from primary supply 2. Since $V_{IN}$ has a value of $+V$ during the time between $t_0$ and $t_1$ and successive alternate half cycles when diodes 14, 24, 34 are forward-biased, operation is essentially the same as described with regard to FIG. 1.

Figure 5:
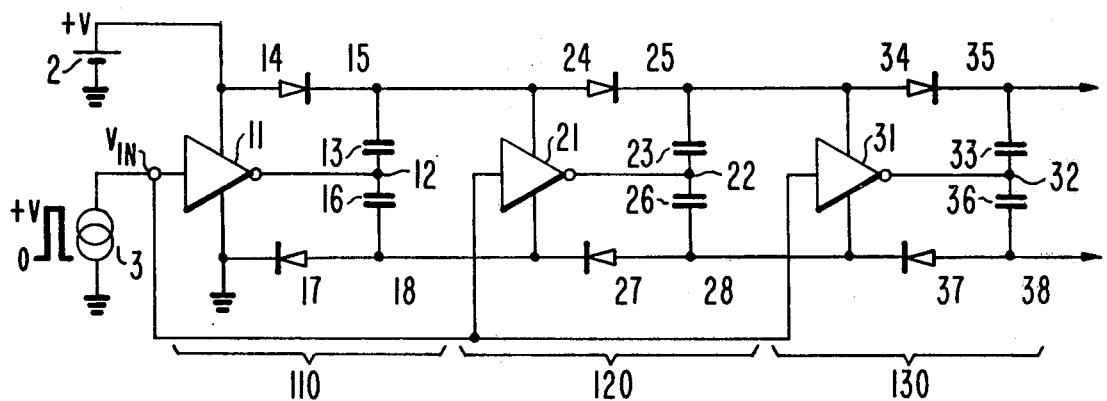

FIG. 5 shows a modification of the FIG. 1 voltage boosting circuit using cascaded stages 110, 120, 130. In this modification the diodes in each successive stage — e.g., 24 and 27 in stage 120 — are biased from the output voltage of the preceeding stage. The FIG. 4 voltage boosting circuit may be similarly modified. These configurations may be desirable in certain integrated circuit configurations since it is not necessary to run as many long busses for connection to each stage, rather all connections except to $V_{IN}$ are on a stage-to-stage basis.

Figure 6:
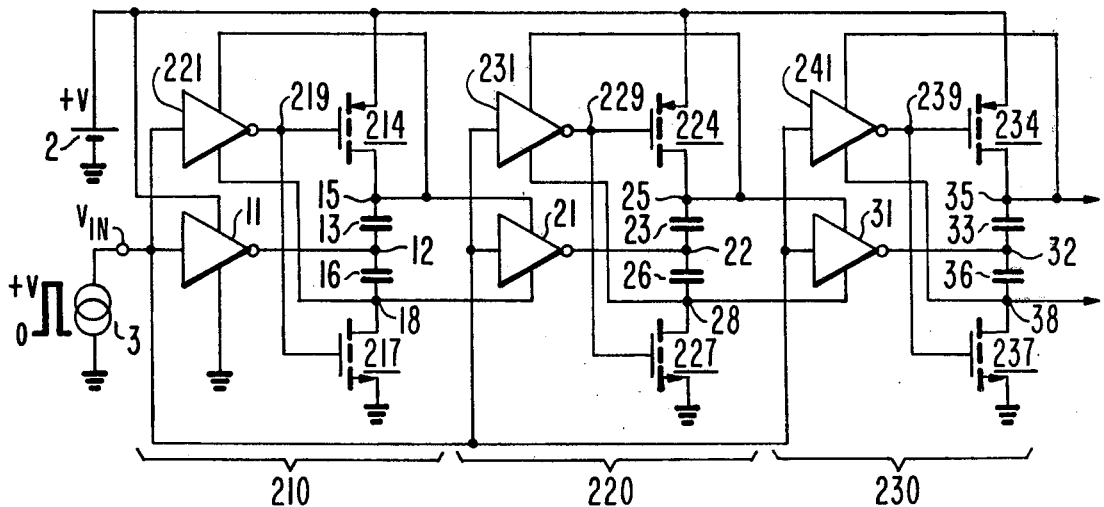
Figure 7:
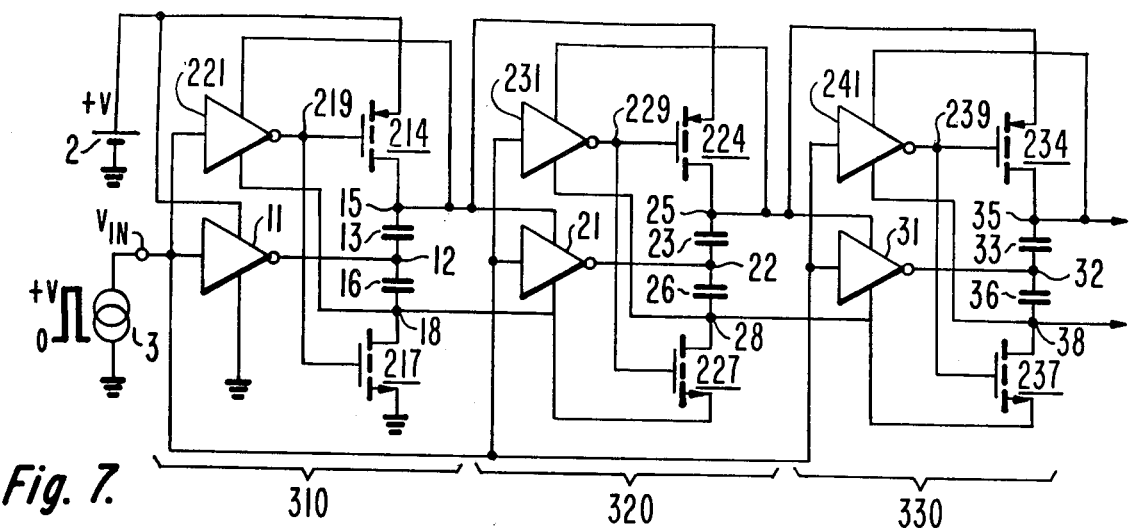

The potential offsets across the diodes 14, 24, 34, 17, 27, 37 used as analog switches in the voltage boosting circuits of FIGS. 1, 4 and 5 tend to reduce their output voltage below the theoretical $2^nV$ value. This is particularly so where the analog switches are concantented as in FIG. 5. As taught in U.S. Pat. No. 4,000,412, this problem may be avoided by substituting field effect transistors (FET's) for the diodes in the analog switches. FIGS. 6 and 7 show such modifications of the FIGS. 1 and 5 voltage boosting circuits, respectively.

In FIGS. 6 and 7 inverter 221 has $V_{15}$ and $V_{18}$ as its relatively positive and negative operating supply voltages, respectively. During the time between $t_0$ and $t_1$ and during every succeeding alternate half cycle of $V_{IN}$, when $V_{IN}$ has a value $+V$, these relatively positive and negative operating potentials have respective values of $+V$ and $-V$. $V_{IN}$ being of value $+V$ is more positive than the mean, ground potential, of these operating potentials during this time; so the output connection of inverter 221 switches to its negative operating potential $-V$. The potential $V_{219}$ that inverter 221 applies to node 219, to which the gates of field effect transistor switches 214 and 217 connect, thus has a value $-V$. Enhancement-mode p-channel FET 214, having its source connected to receive $+V$ potential from primary supply 2, is biased into conduction by $V_{219} = -V$ being applied to its gate electrode and clamps its drain electrode (connected to node 15) to the $+V$ potential at its source electrode. Enhancement-mode n-channel FET 217, having its source electrode connected to ground potential, is biased into non-conduction by $V_{219} = V$ being applied to its gate electrode; and node 18 to which its drain electrode connects is free to assume the potential applied via capacitor 16.

Inverter 231 has $V_{25}$ and $V_{28}$ as its relatively positive and negative operating supply voltages. When $V_{IN}$ has a value $+V$, $V_{25}$ and $V_{28}$ have values of $+V$ and $-3V$, respectively. Their mean value is $-V$, which is exceeded by $V_{IN} = +V$, so the output connection of inverter 231 is switched to its negative operating potential $-3V$, which voltage is applied as $V_{229}$ to node 229 to which the gates of enhancement-mode FET's 224 and 227 connect. P-channel FET 224, having its source electrode connected to $+V$ potential in FIG. 6 and to node 15 in FIG. 7 to receive $V_{15} = +V$, is biased into conduction and clamps node 25, connected to its drain electrode, to the $+V$ potential at its source electrode. N-channel FET 227, having its source electrode connected to ground in FIG. 6 and to node 18 in FIG. 7 to receive $V_{18} = -V$, is biased into non-conduction, leaving its drain electrode and node 28 connected thereto free to assume the potential applied via capacitor 26.

Inverter 241 has as its relatively positive and negative operating potentials $V_{35}$ and $V_{38}$, respectively, the potentials at nodes 35 and 38, respectively. When $V_{IN}=+V$, $V_{35}=+V$ and $V_{38}=-7V$; and their mean value is $-3V$, which is exceeded by $V_{IN}$. So inverter 241 is switched to apply a voltage $V_{239}$ to node 239 equal to the $-7V$ negative operating potential. Enhancement-mode p-channel FET 234, having its source electrode connected to $+V$ in FIG. 6 and to $V_{25}=+V$ in FIG. 7, is biased into conduction by $V_{219}=-7V$ applied to its gate electrode and clamps node 35, connected to its drain electrode, to the $+V$ potential at its source electrode. Enhancement-mode n-channel FET 237, having its source electrode connected to ground in FIG. 6 and to node 28 to receive $V_{28}=-3V$ in FIG. 7, is biased into nonconduction, leaving its collector electrode and node 38 connected thereto free to assume the potential applied via capacitor 36.

On the other hand, during the time between $t_1$ and $t_2$ and every succeeding alternate half cycle of $V_{IN}$, when $V_{IN}$ is ground-valued, the following conditions obtain. $V_{15}$ and $V_{18}$, the relatively positive and negative operating potentials of inverter 221 have values $+2V$ and ground, respectively, with mean value $+V$. $V_{25}$ and $V_{28}$, the relatively positive and negative operating potentials of inverter 231 have values $+4V$ and ground, respectively, with mean value $+2V$. $V_{35}$ and $V_{38}$, the relatively positive and negative operating potentials of inverter 241 have values $+8V$ and ground, respectively, with mean value $+4V$. $V_{IN}$ with a value of ground is less positive than any of these means values, so each of inverters 221, 231 and 241 is switched to place its output connections at a potential substantially equal to its relatively positive operating potential. Accordingly, $V_{219}$ at node 219 equals $+2V$ during this time; $V_{229}$ at node 229 equals $+4V$; and $V_{239}$ at node 239 equals $+8V$.

With the source of electrodes of FET's 214 and 217 being at $+V$ and ground, respectively, owing to their connections to primary supply 2, $V_{219}=+2V$ at their gate electrodes biases p-channel FET 214 into non-conduction and n-channel FET 217 into conduction to leave node 15 free to assume potential applied thereto via capacitor 13 and to clamp node 18 to ground potential. With the source electrode of p-channel FET 224 being at $+V$ owing to its connection to primary supply 2 in FIG. 6 or at $+2V$ owing to its connection to node 15 to receive $V_{15}$ in FIG. 7, $V_{229}=+4V$ at its gate electrode biases it into non-conduction to let node 25 assume potential applied thereto via capacitor 23. With the source electrode of n-channel FET 227 being connected to ground potential in FIG. 6 or to node 18 to receive $V_{18}$ equalling ground potential in FIG. 7, $V_{229}=+4V$ applied to its gate electrode biases FET 227 into conduction to clamp its drain electrode and node 28 connected thereto to the ground potential at its source electrode. With the source electrode of p-channel FET 234 being at $+V$ owing to its connection to primary supply 2 in FIG. 6 or to node 25 to receive $V_{25}$ in FIG. 7, $V_{239}=+8V$ applied to its gate electrode biases FET 234 into non-conduction to let node 35 assume potential applied thereto via capacitor 33. With the source electrode of n-channel FET 237 being at ground potential owing to its connection to primary supply 2 in FIG. 6 or to node 28 to receive $V_{28}$ in FIG. 7, $V_{239}=8V$ applied to its gate electrode biases FET 237 into conduction and clamps its drain electrode and node 38 connected thereto to the ground potential at its source electrode.

Switching of the FET switches 214, 217, 224, 227, 234, 237 into conduction at their appointed times is accomplished with sufficiently large source-to-gate potentials to reduce their channel impedances as between their source and drain electrodes to sufficiently two values that the potential drop across their conductive channels are negligibly small.

Figure 8:
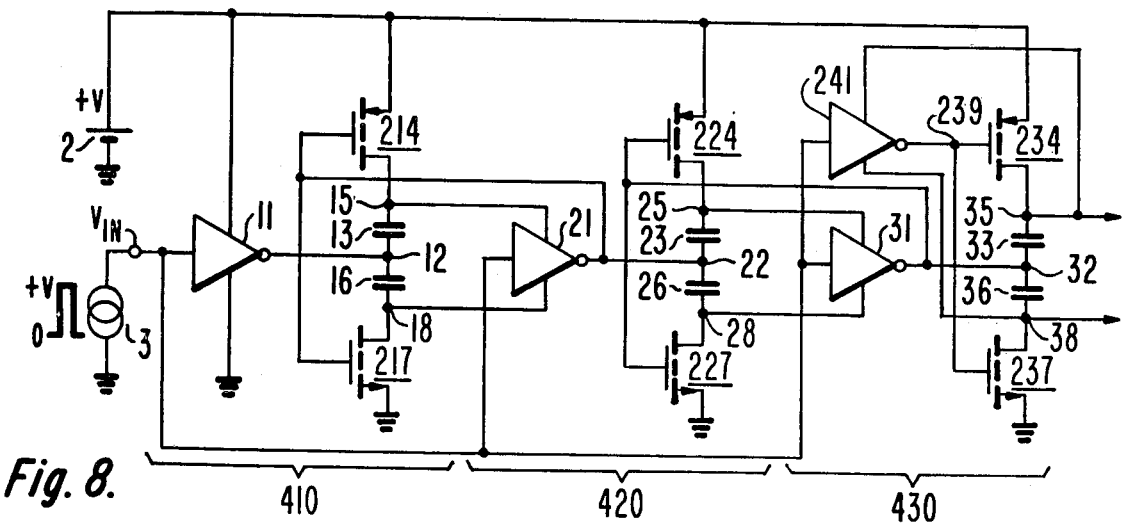
Figure 9:
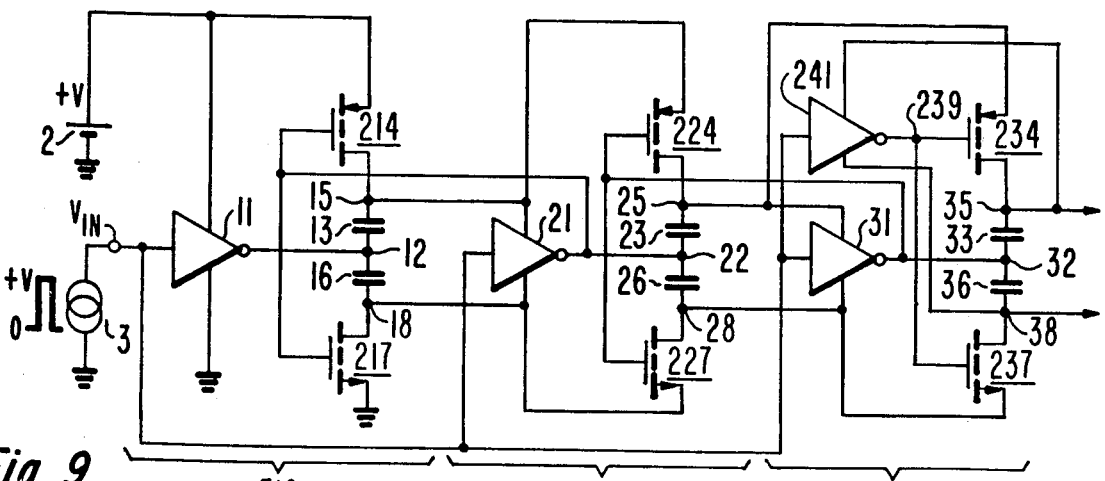

FIGS. 8 and 9 show modifications of the FIGS. 6 and 7 voltage boosting circuits, respectively, in which each voltage boosting stage uses an inverter already available in a succeeding state to govern the switching of its FET switches used to clamp its capacitor selectively. In stages 410 and 420 of the FIG. 8 circuit, the inversions provided by inverters 221 and 231 of FIG. 6 are respectively assumed by inverters 21 and 31 in succeeding stages 420 and 430. In stages 510 and 520 of the FIG. 9 circuit, the inversions provided by inverters 221 and 231 of FIG. 7 are respectively assumed by inverters 21 and 31 in succeeding stages 520 and 530.

While the operation of the circuitry shown in FIGS. 1, 4, 5, 6, 7, 8 and 9 has assumed operation with $V_{IN}$ being a square wave, the circuits of the present invention may also be operated with $V_{IN}$ being a rectangular wave with other than 1:1 mark-to-space ratio, and the claims should be construed accordingly.

I claim:
1. A voltage booster circuit comprising:
   first and second terminals for connection to a voltage supply supplying said first and second terminals first and second operating voltages, respectively, which are respectively relatively positive and relatively negative with respect to each other;
   a first inverter having a first power supply connection to said first terminal, having a second power supply connection to said second terminal, having an input connection for receiving switching signals which swing between first and second potential levels, having an output connection, and being of a type in which a potential level substantially equal to that applied to its first power supply connection appears at its output connection responsive to the second level of switching signal potential at its input connection, and in which a potential level substantially equal to that applied to its second power supply connection appears at its output connection responsive to the first level of switching signal potential at its input connection;
   first and second circuit nodes between which a voltage essentially twice as large as the difference between said relatively negative and relatively positive operating voltages is to be developed;
   a first booster capacitance connected between the output connection of said first inverter and said first circuit node;
   a second booster capacitance connected between the output connection of said first inverter and said second circuit node;
   a first analog switch means selectively closing essentially only whenever said switching signal potential is at its second level for applying said first operating voltage to said first circuit node;
   a second analog switch means selectively closing essentially only whenever said switching signal is at its first level for applying said second operating voltage to said second circuit node; and a second inverter having a first power supply connection to said first circuit node, having a second power supply connected to said second circuit node, having an input connection for receiving said switching signal potential, being of a type in which a potential level substantially equal to that applied to its first power supply connection appears at its output connection responsive to the second level of switching signal potential at its input connection, and in which a potential level substantially equal to that applied to its second power supply connection appears at its output connection responsive to the first level of switching signal potential at its input connection, whereby a voltage is produced at the output connection of said second inverter that exhibits an amplitude swing essentially three times as large as the difference between said relatively negative and relatively positive operating voltages.

2. A voltage booster circuit as set forth in claim 1 wherein said first analog switch means comprises a first unilaterally conductive device having an anode connected to said first terminal and having a cathode connected to said first circuit node, and wherein said second analog switch means comprises a second unilaterally conductive device having an anode connected to said second circuit node and having a cathode connected to said second terminal.

3. A voltage booster circuit as set forth in claim 2 further including:
   third and fourth circuit nodes between which a voltage essentially four times as large as the difference between said relatively negative and relatively positive operating voltage is to be developed;
   a third unilaterally conductive device having an anode connected to said first circuit node and having a cathode connected to said third circuit node;
   a third booster capacitance connected between said third circuit node and the output connection of said second inverter;
   a fourth unilaternally conductive device having a cathode connected to said second circuit node and having an anode connected to said fourth circuit node; and
   a fourth booster capacitance connected between said fourth circuit node and the output connection of said second inverter.

4. A voltage booster circuit as set forth in claim 1 wherein said first analog switch means comprises a first field effect transistor, of p-channel type, with a source electrode connected to said first terminal, with a drain electrode connected to said first circuit node, and with a gate electrode to which the output connection of said second inverter is connected; and wherein said second analog switch means comprises a second field effect transistor, of n-channel type, with a source electrode connected to said second terminal, with a drain electrode connected to said second circuit node, and with a gate electrode to which the output connection of said second inverter is connected.

5. A voltage booster circuit comprising:
   first and second terminals for connection to a voltage supply supplying said first and second terminals first and second operating voltages, respectively, which are respectively relatively positive and relatively negative with respect to each other;
   a first inverter having a first power supply connection to said first terminal, having a second power supply connection to said second terminal, having an input connection for receiving switching signals which swing between first and second potential levels, having an output connection, and being of a type in which a potential level substantially equal to that applied to its first power supply connection appears at its output connection responsive to the second level of switching signal potential at its input connection, and in which a potential level substantially equal to that applied to its second power supply connection appears at its output connection responsive to the first level of switching signal potential at its input connection;
   first and second circuit nodes between which a voltage essentially twice as large as the difference between said relatively negative and relatively positive operating voltages is to be developed;
   a first booster capacitance connected between the output connection of said first inverter and said first circuit node;
   a second booster capacitance connected between the output connection of said first inverter and said second circuit node;
   a first analog switch means selectively closing essentially only whenever said switching signal potential is at its second level for applying said first operating voltage to said first circuit node, said first analog switch means comprising a first unilaterally conductive device having an anode connected to said first terminal and having a cathode connected to said first circuit node;
   a second analog switch means selectively closing essentially only whenever said switching signal is at its first level for applying said second operating voltage to said second circuit node, said second analog switch means comprising a second unilaterally conductive device having an anode connected to said second circuit node and having a cathode connected to said second terminal;
   a second inverter having a first power supply connection to said first circuit node, having a second power supply connected to said second circuit node, having an input connection for receiving said switching signal potential, being of a type in which a potential level substantially equal to that applied to its first power supply connection appears at its output connection responsive to the second level of switching signal potential at its input connection, and in which a potential level substantially equal to that applied to its second power supply connection appears at its output connection responsive to the first level of switching signal potential at its input connection, whereby a voltage is produced at the output connection of said second inverter that exhibits an amplitude swing essentially three times as large as the difference between said relatively negative and relatively positive operating voltages;
   third and fourth circuit nodes between which a voltage essentially four times as large as the difference between said relatively negative and relatively positive operating voltage is to be developed;
   a third unilaterally conductive device having an anode connected to said first terminal and having a cathode connected to said third circuit node;
   a third booster capacitance connected between said third circuit node and the output connection of said second inverter;

a fourth unilaterally conductive device having a cathode connected to said second terminal and having an anode connected to said fourth circuit node; and a fourth booster capacitance connected between said fourth circuit node and the output connection of said second inverter.

6. A voltage booster circuit comprising:

first and second terminals for connection to a voltage supply supplying said first and second terminals, first and second operating voltages respectively which are respectively relatively positive and relatively negative with respect to each other;

a first plurality, n in number, of inverters ordinally numbered, consecutively from first to $n^{th}$, each having first and second power supply connections, having an input connection for receiving a switching signal potential which swings between first and second levels, having an output connection, and being of a type in which a potential level substantially equal to that applied to its first power supply connection appears at its output connection responsive to the second level of switching signal potential at its input connection, and in which a potential level substantially equal to that applied to its second power supply connection appears at its output connection responsive to the first level of switching signal potential at its input connection;

a first plurality, n in number, of booster capacitances ordinally numbered consecutively from first to $n^{th}$, each having a first plate connected to the output connection of the one of said first plurality of inverters similarly ordinally numbered, and each having a second plate;

a first plurality, n in number, of analog switch means ordinally numbered consecutively from first to $n^{th}$, each selectively closing essentially only whenever said switching signal potential is at its second level for applying said first operating voltage to the second plate of the one of said booster capacitances similarly ordinally numbered;

a second plurality, n in number, of booster capacitances ordinally numbered consecutively from n plus first to $2n^{th}$, each having a first plate connected to the output connection of the one of said first plurality of inverters bearing an ordinal number lower by n than its own, and each having a second plate;

a second plurality, n in number, of analog switch means ordinally numbered consecutively from n plus first to $2n^{th}$, each selectively closing essentially only whenever said switching signal potential is at its first level for applying said second operating voltage to the second plate of the one of said booster capacitances similarly ordinally numbered;

means for connecting the first and second power supply connections of said first inverter to said first terminal and to said second terminal, respectively;

means for connecting the first power supply connection of each succeeding one, beginning with the second, of said first plurality of inverters to the second plate of the one of said first plurality of booster capacitances bearing an ordinal number one lower than its own; and means for connecting the second power supply connection of each succeeding one, beginning with the second, of said first plurality of inverters to the second plate of the one of said second plurality of booster capacitances bearing an ordinal number (n-1) higher than its own, whereby a booster rectangular-wave having a peak-to-peak voltage amplitude essentially $2^n$ times the difference between said first and second operating voltages appears between the second plates of said $n^{th}$ and $2n^{th}$ booster capacitances.

7. A voltage booster circuit as set forth in claim 6 wherein each of said first plurality of analog switch means comprises a respective unilaterally conductive device bearing the same ordinal number as the analog switch means in which it is included, having an anode to which said first operating voltage is applied at least whenever said switching signal potential is at said first level, and having a cathode connected to the second plate of said booster capacitance bearing the same ordinal number as its own, for applying said first operating potential to the second plate of that booster capacitance when its first plate is brought by the output connection of the inverter bearing the same ordinal number to the potential at the second power supply connection of that inverter; and wherein each of said second plurality of analog switch means comprises a respective unilaterally conductive device bearing the same ordinal number as the analog switch means in which it is connected, having a cathode to which said second operating voltage is applied at least whenever said switching signal potential is at said second level and having an anode connected to the second plate of the one of said booster capacitances bearing the same ordinal number as said analog switch means, for applying said second operating potential to the second plate of that booster capacitance when its first plate is brought by the output connection of the inverter bearing an ordinal number lower by n than its own to the potential at the first power supply connection of that inverter.

8. A voltage booster circuit as set forth in claim 6 wherein said first analog switch means comprises a first unilaterally conductive device having an anode to which said first operating voltage is applied at least whenever said switching signal potential is at said first level and having a cathode connected to the second plate of said first booster capacitor; wherein each of the second through $n^{th}$ of said first plurality of analog switch means comprises a respective unilaterally conductive device bearing the same ordinal number as the analog switch means in which it is included, having a cathode connected to the second plate of the one of said first plurality of booster capacitances bearing the same ordinal number as its own, and having an anode connected to the cathode of the unilaterally conductive device bearing an ordinal number smaller by one than its own; wherein said n plus first analog switch means comprises an n plus first unilaterally conductive device having a cathode to which said second operating voltage is applied at least whenever said switching signal potential is at said second level and having an anode connected to the second plate of said n plus first capacitor; and wherein each of the n plus second through $2n^{th}$ of said second plurality of analog switch means comprises a respective unilaterally conductive device bearing the same ordinal number as the analog switch in which it is included, having an anode connected to the second plate of the one of said second plurality of booster capacitances bearing the same ordinal number as its own, and having a cathode connected to the cathode of the unilaterally conductive device bearing an ordinal number smaller by one than its own.

9. A voltage booster circuit as set forth in claim 6 including:
- a second plurality, n in number, of inverters ordinally numbered successively from said n plus first through $2n^{th}$, each having a first power supply connection to the second plate of the one of said booster capacitances bearing an ordinal number lower by n than its own, having a second power supply connection to the second plate of the one of said booster capacitances bearing the same ordinal number as its own, having an input connection to which said switching signal potential is applied, having an output connection, and being of a type in which a potential level substantially equal to that applied to its first power supply connection appears at its output connection responsive to the second level of switching signal potential at its input connection, and in which a potential level substantially equal to that applied to its said power supply connection appears at its output connection responsive to the first level of switching signal potential at its input connection;
- a plurality, n in number, of p-channel field effect transistors ordinally numbered from first to $n^{th}$, each included within said analog switch means bearing an ordinal number the same as its own, each having a gate electrode connected to the output connection of said inverter bearing an ordinal number higher by n than its own, each having a source electrode to which said first operating voltage is applied at least whenever said switching signal potential is at its second level and each having a drain electrode connected to the second plate of said booster capacitance bearing an ordinal number the same as its own; and
- a plurality, n in number, of n-channel field effect transistors ordinally numbered from first to $n^{th}$, each included within said analog switch means bearing an ordinal number higher by n than its own, each having a gate electrode connected to the output connection of said inverter bearing an ordinal number higher by n than its own, each having a source electrode to which said second operating voltage is applied at least whenever said switching signal potential is at its first level and each having a drain electrode connected to the second plate of said booster capacitance bearing an ordinal number higher by n than its own.

10. A voltage booster circuit as set forth in claim 6 including:
- an n plus first inverter having a first power supply connection to the second plate of said $n^{th}$ booster capacitance, having a second power supply connection to the second plate of the $2n^{th}$ booster capacitance, having an input connection to which said switching signal potential is applied, having an output connection, and being of a type in which a potential level substantially equal to that applied to its first power supply connection appears at its output connection responsive to the second level of switching signal potential at its input connection, and in which a potential level substantially equal to that applied to its said power supply connection appears at its output connection responsive to the first level of switching signal potential at its input connection;
- a plurality, n in number, of p-channel field effect transistors ordinally numbered from first to $n^{th}$, each included within said analog switch means bearing an ordinal number the same as its own, each having a gate electrode connected to the output connection of said inverter bearing an ordinal number one greater than its own, each having a source electrode to which said first operating voltage is applied at least whenever said switching signal potential is at its second level, and each having a drain electrode connected to the second plate of said booster capacitance bearing an ordinal number the same as its own; and
- a plurality, n in number, of p-channel field effect transistors ordinally numbered from first to $n^{th}$, each included within said analog switch means bearing an ordinal number higher by n than its own, each having a gate electrode connected to the output connection of said inverter bearing an ordinal number one greater than its own and each having a source electrode connected to which said second operating voltage is applied at least whenever said switching signal potential is at its first level, and each having a drain electrode connected to the second plate of said booster capacitance bearing an ordinal number higher by n than its own.

11. A voltage booster circuit as set forth in claim 6 including:
- a second plurality, n in number, of inverters ordinally numbered successively from said n plus first through $2n^{th}$, each having a first power supply connection to the second plate of the one of said booster capacitances bearing an ordinal number lower by n than its own, having a second power supply connection to the second plate of the one of said booster capacitances bearing the same ordinal number as its own, having an input connection to which said switching signal potential is applied, having an output connection, and being of a type in which a potential level substantially equal to that applied to its first power supply connection appears at its output connection responsive to the second level of switching signal potential at its input connection, and in which a potential level substantially equal to that applied to its said power supply connection appears at its output connection responsive to the first level of switching signal potential at its input connection;
- a plurality, n in number, of p-channel field effect transistors ordinally numbered from first to $n^{th}$, each included within said analog switch means bearing an ordinal number the same as its own, each having a gate electrode connected to the output connection of said inverter bearing an ordinal number higher by n than its own, each having a source electrode, and each having a drain electrode connected to the second plate of said booster capacitance bearing an ordinal number the same as its own;
- means applying said first operating potential to the source electrode of the first of said plurality of p-channel transistors at least whenever said switching signal is at its second level;
- means connecting the source electrode of each of the other of said plurality of p-channel transistors to the first power supply connection of the inverter bearing an ordinal number the same as its own;
- a plurality, n in number, of n-channel field effect transistors ordinally numbered from first to $n^{th}$, each included within said analog switch means bearing an ordinal number higher by n than its own, each having a gate electrode connected to the output connection of said inverter bearing an ordinal number higher by n than its own, each having a source electrode, and each having a drain electrode connected to the second plate of said booster capacitance bearing an ordinal number higher by n than its own;

means applying said second operating potential to the source electrode of the first of said plurality of n-channel transistors at least whenever said switching signal is at its first level; and means connecting the source electrode of each of the others of said plurality of n-channel transistors to the second power supply connection of the inverter bearing an ordinal number the same as its own.

12. A voltage booster circuit comprising:

first and second terminals for connection to a voltage supply supplying said first and second terminals first and second operating voltages, respectively, which are respectively relatively positive and relatively negative with respect to each other;

a first inverter having a first power supply connection to said first terminal, having a second power supply connection to said second terminal, having an input connection for receiving switching signals which swing between first and second potential levels, having an output connection, and being of a type in which a potential level substantially equal to that applied to its first power supply connection appears at its output connection responsive to the second level of switching signal potential at its input connection, and in which a potential level substantially equal to that applied to its second power supply connection appears at its output connection responsive to the first level of switching signal potential at its input connection;

first and second circuit nodes between which a voltage essentially twice as large as the difference between said relatively negative and relatively positive operating voltages is to be developed;

a first booster capacitance connected between the output connection of said first inverter and said first circuit node;

a second booster capacitance connected between the output connection of said first inverter and said second circuit node;

a first analog switch means selectively closing essentially only whenever said switching signal potential is at its second level for applying said first operating voltage to said first circuit node;

a second analog switch means selectively closing essentially only whenever said switching signal is at its first level for applying said second operating voltage to said second circuit node;

an n plus first inverter having a first power supply connection to the second plate of said $n^{th}$ booster capacitance, having a second power supply connection to the second plate of the $2n^{th}$ booster capacitance, having an input connection to which said switching signal potential is applied, having an output connection, and being of a type in which a potential level substantially equal to that applied to its first power supply connection appears at its output connection responsive to the second level of switching signal potential at its input connection, and in which a potential level substantially equal to that applied to its said second power supply connection appears at its output connection responsive to the first level of switching signal potential at its input connection;

a plurality, n in number, of p-channel field effect transistors ordinally numbered from first to $n^{th}$, each included within said analog switch means bearing an ordinal number the same as its own, each having a gate electrode connected to the output connection of said inverter bearing an ordinal number one greater than its own, each having a source electrode, and each having a drain electrode connected to the second plate of said booster capacitance bearing an ordinal number the same as its own;

means applying said first operating potential to the source electrode of the first of said plurality of p-channel transistors at least whenever said switching signal is at its second level;

means connecting the source electrode of each of the others of said plurality of p-channel transistors to the first power supply connection of the inverter bearing an ordinal number the same as its own;

a plurality, n in number, of n-channel field effect transistors ordinally numbered from first to $n^{th}$, each included within said analog switch means bearing an ordinal number higher by n than its own, each having a gate electrode connected to the output connection of said inverter bearing an ordinal number one greater than its own, each having a source electrode, and each having a drain electrode connected to the second plate of said booster capacitance bearing an ordinal number higher by n than its own;

means applying said second operating potential to the source electrode of the first of said plurality of n-channel transistors at least whenever said switching signal is at its first level; and means connecting the source electrode of each of the other of said plurality of n-channel transistors to the second power supply connection of the inverter bearing an ordinal number the same as its own.

* * * * *

UNITED STATES PATENT AND TRADEMARK OFFICE
CERTIFICATE OF CORRECTION

PATENT NO. : 4,149,232
DATED : April 10, 1979
INVENTOR(S) : Sargent Sheffield Eaton, Jr.

It is certified that error appears in the above—identified patent and that said Letters Patent is hereby corrected as shown below:

Column 2, line 36, "5" should read -- 15 --.
          line 53, "biased" should read -- biases --.

Column 3, line 43, "capcitor" should read -- capacitor --.

Column 5, line 68, insert -- + --, before "8V".

<u>Claim 1</u>
Column 6, line 63, "second level" should read -- first level --.
         line 67, "first level" should read -- second level --.

<u>Claim 5</u>
Column 8, line 26, "second level" should read -- first level --.
         line 34, "first level" should read -- second level --.

<u>Claim 6</u>
Column 9, line 38, "second level" should read -- first level --.
         line 53, "first level" should read -- second level --.

<u>Claim 12</u>
Column 13, line 55, "second level" should read -- first level --.
Column 14, line 1, "first level" should read -- second level --.

Signed and Sealed this

Eleventh Day of December 1979

[SEAL]

Attest:

SIDNEY A. DIAMOND

Attesting Officer      Commissioner of Patents and Trademarks